US008096875B2

(12) United States Patent
Ryan

(10) Patent No.: US 8,096,875 B2
(45) Date of Patent: Jan. 17, 2012

(54) GAMING SYSTEM HAVING A MANUFACTURER PLAYER TRACKING SYSTEM AND METHODS THEREFOR

(75) Inventor: Chad A. Ryan, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 627 days.

(21) Appl. No.: 12/297,553

(22) PCT Filed: Apr. 18, 2007

(86) PCT No.: PCT/US2007/009656

§ 371 (c)(1), (2), (4) Date: Feb. 3, 2009

(87) PCT Pub. No.: WO2007/124047

PCT Pub. Date: Nov. 1, 2007

(65) Prior Publication Data

US 2009/0156304 A1 Jun. 18, 2009

Related U.S. Application Data

(60) Provisional application No. 60/793,595, filed on Apr. 20, 2006.

(51) Int. Cl.
*A63F 13/00* (2006.01)

(52) U.S. Cl. ................ 463/29; 463/21; 463/22; 463/23; 463/24; 463/25

(58) Field of Classification Search ............... 463/16–29
See application file for complete search history.

(56) References Cited

U.S. PATENT DOCUMENTS

2003/0004871 A1* 1/2003 Rowe .............................. 705/39
2003/0130042 A1* 7/2003 Ollins .............................. 463/43
2005/0003890 A1* 1/2005 Hedrick et al. ................. 463/29
2005/0054438 A1* 3/2005 Rothschild et al. ............. 463/29
2005/0096130 A1* 5/2005 Mullins ........................... 463/27
2005/0288085 A1* 12/2005 Schubert et al. ................ 463/11
2006/0183538 A1* 8/2006 Michaelson et al. ............ 463/27
2007/0026943 A1* 2/2007 Yoshimura ...................... 463/29
2007/0060332 A1* 3/2007 Anderson et al. ............... 463/29
2007/0060381 A1* 3/2007 Weiss .............................. 463/42
2007/0117623 A1* 5/2007 Nelson et al. ................... 463/29
2007/0213132 A1* 9/2007 Chilton et al. .................. 463/42
2008/0051193 A1* 2/2008 Kaminkow et al. ............. 463/25
2008/0051195 A1* 2/2008 Hedrick et al. ................. 463/29

OTHER PUBLICATIONS

International Search Report—PCT/US07/09656 dated Sep. 16, 2008 (2 pages).
Written Opinion—PCT/US07/09656 dated Sep. 16, 2008 (5 pages).

* cited by examiner

*Primary Examiner* — N Drew Richards
*Assistant Examiner* — Ankush Singal
(74) *Attorney, Agent, or Firm* — Nixon Peabody LLP

(57) ABSTRACT

A gaming system includes a wager input device and a display for displaying a wagering game. The gaming system further includes a manufacturer player identification reader for receiving a manufacturer player identifier and a casino player identification reader for receiving a casino player identifier. The system further includes a controller operative to associate the casino player identifier with the manufacturer player identifier.

20 Claims, 5 Drawing Sheets

GAMING SYSTEM HAVING A MANUFACTURER PLAYER TRACKING SYSTEM AND METHODS THEREFOR

CROSS-REFERENCE TO RELATED APPLICATIONS

This application is a U.S. national stage of International Application No. PCT/US2007/009656, filed Apr. 18, 2007, which is related to and claims priority to U.S. Provisional Application No. 60/793,595, filed Apr. 20, 2006, each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

1. Field of the Invention

The present invention relates generally to gaming machines, and methods for playing wagering games, and more particularly, to a gaming system having a manufacturer player tracking system.

2. Background of the Invention

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Many casinos who own and operate gaming machines and systems utilize various player tracking systems to award loyal players. One problem that exists is that traditional player tracking systems are operated by casinos and only track information perceived as valuable by the casino. Such player tracking systems tracking players' gameplay at gaming machines and award players with points redeemable for non-monetary prizes such as food, entertainment, and accommodations. However, casino player tracking systems typically track gameplay data of importance to casinos, which is often different than information useful to gaming machine manufacturers. Moreover, casinos operate different player tracking systems often requiring a player who plays at more than one casino to carry with him several or many player tracking cards, one for use at each casino. Carrying such a collection of cards causes inconvenience and disorganization. Furthermore, although many players play at various casinos, some players prefer to play gaming machines manufactured by only one manufacturer. The present invention is directed to solving one or more of these and other problems.

SUMMARY OF THE INVENTION

According to one aspect of the present invention, a gaming system includes a wager input device and a display for displaying a wagering game. The gaming system further includes a manufacturer player identification reader for receiving a manufacturer player identifier and a casino player identification reader for receiving a casino player identifier. The system further includes a controller operative to associate the casino player identifier with the manufacturer player identifier.

According to another aspect of the invention, a method of logging a player into a casino player tracking system for use during play of a wagering game on a gaming system comprises reading a manufacturer player identifier provided by a player. The method further comprises retrieving a casino player identifier associated with the player; and logging the player into a casino player tracking system using the casino player identifier.

According to yet another aspect of the invention, a method of associating one or more casino player identifiers with a manufacturer player identifier for use during play of a wagering game comprises receiving a manufacturer player identifier associated with a player of the wagering game. The method further comprises receiving a casino player identifier associated with the player. The method further comprises associating the casino player identifier and the manufacturer player identifier and storing the association in memory accessible by a manufacturer player tracking reader for future recall.

According to yet another aspect of the invention, a computer readable storage medium is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
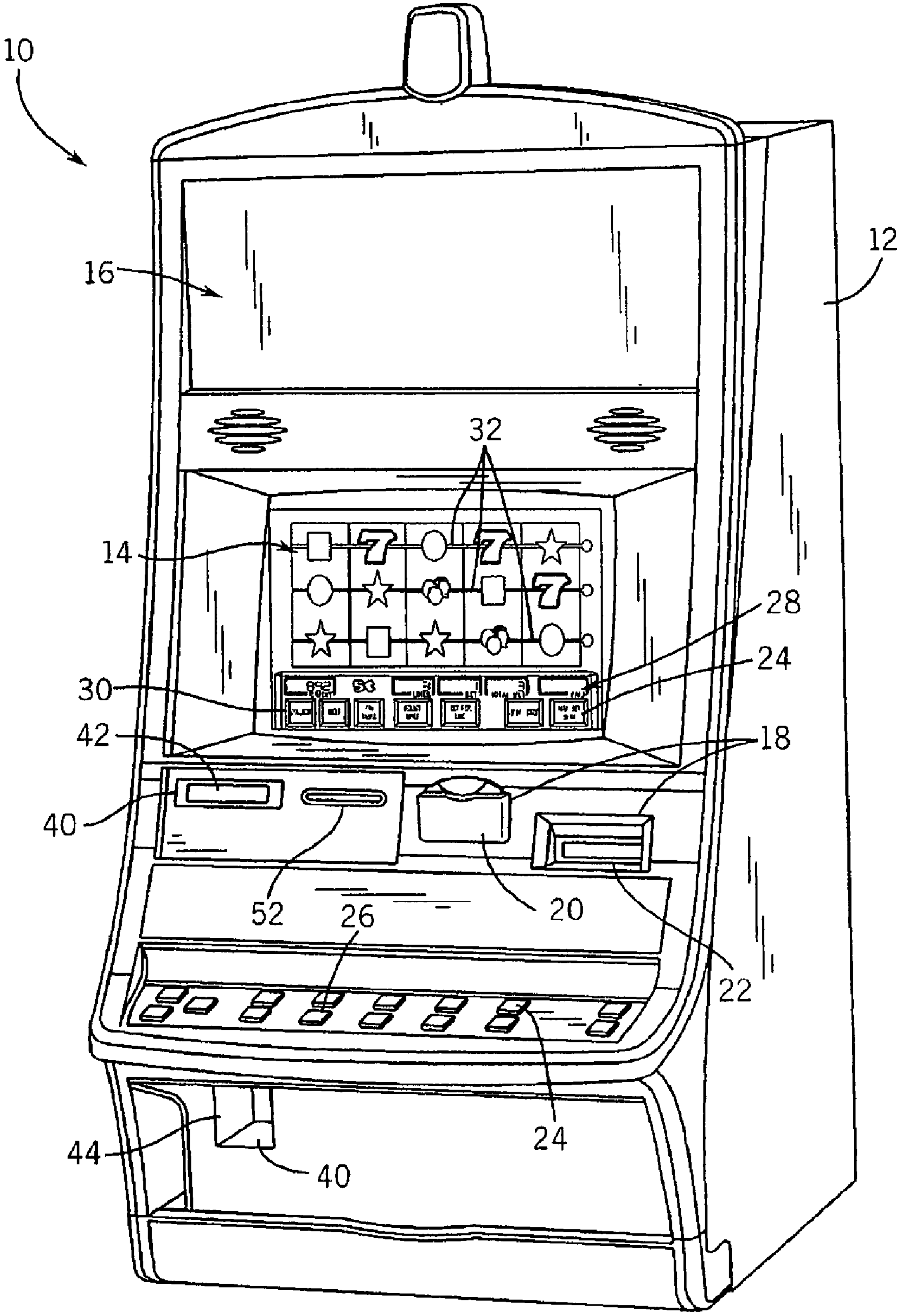
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface Moreover, the player information reader 52 may be an input by the player into the gaming machine 10, such as entering a unique username and password associated with the player or the player's account. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
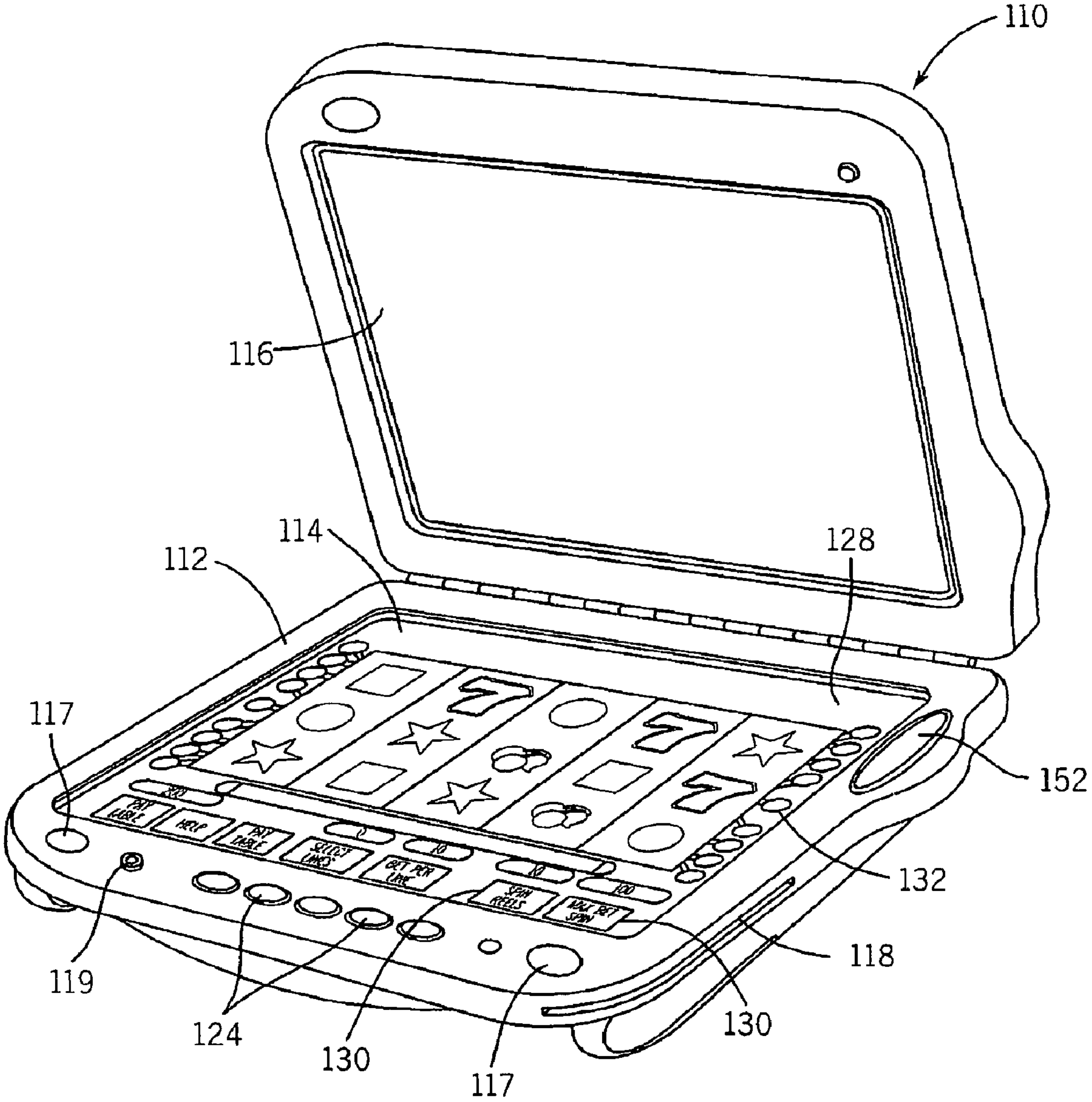
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld -gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1, comprises a biometric sensing device.

Figure 2:
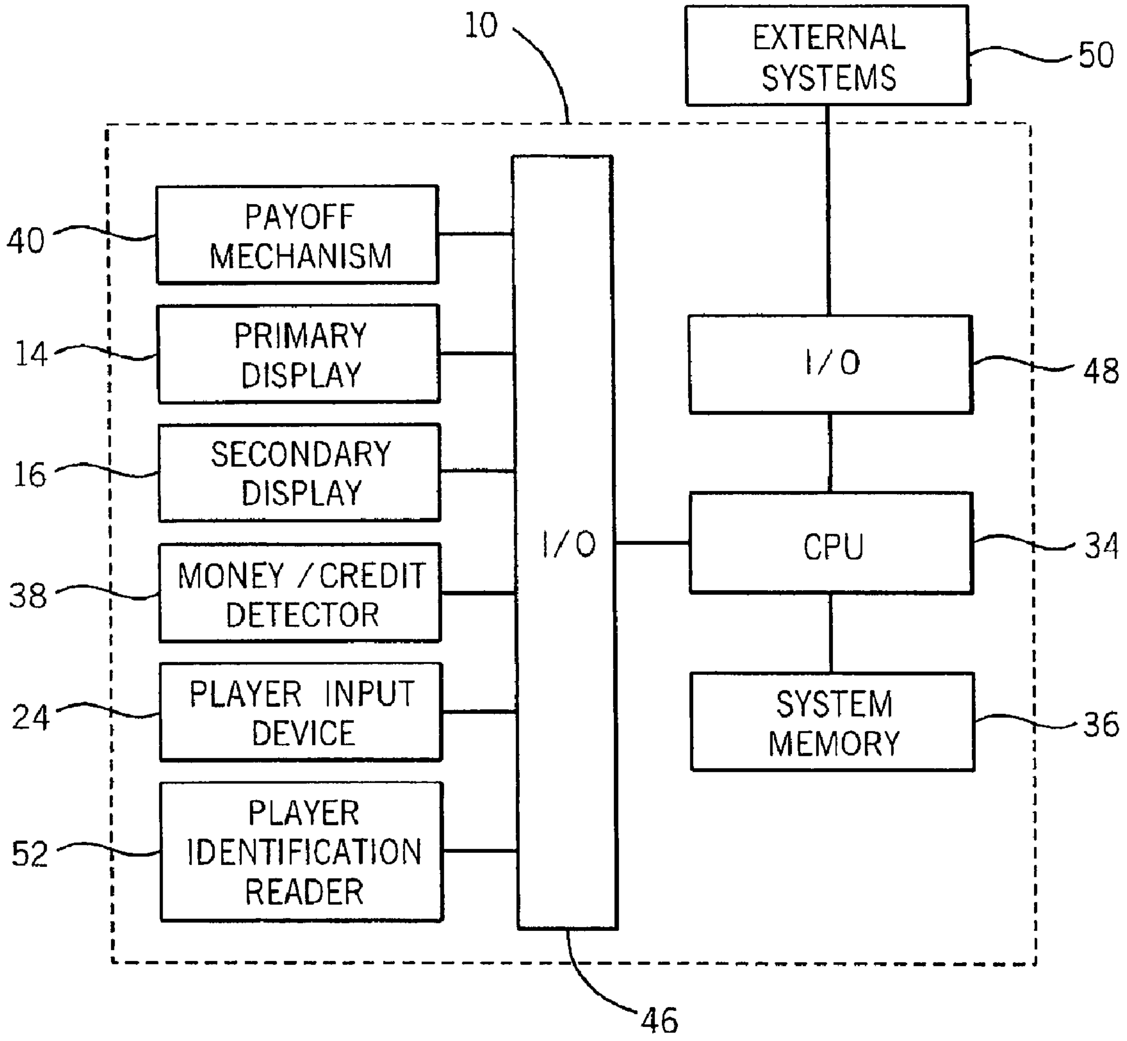
FIG. 2 is a block diagram of a control system suitable for operating the gaming machines of FIGS. la and lb.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machines 10,110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
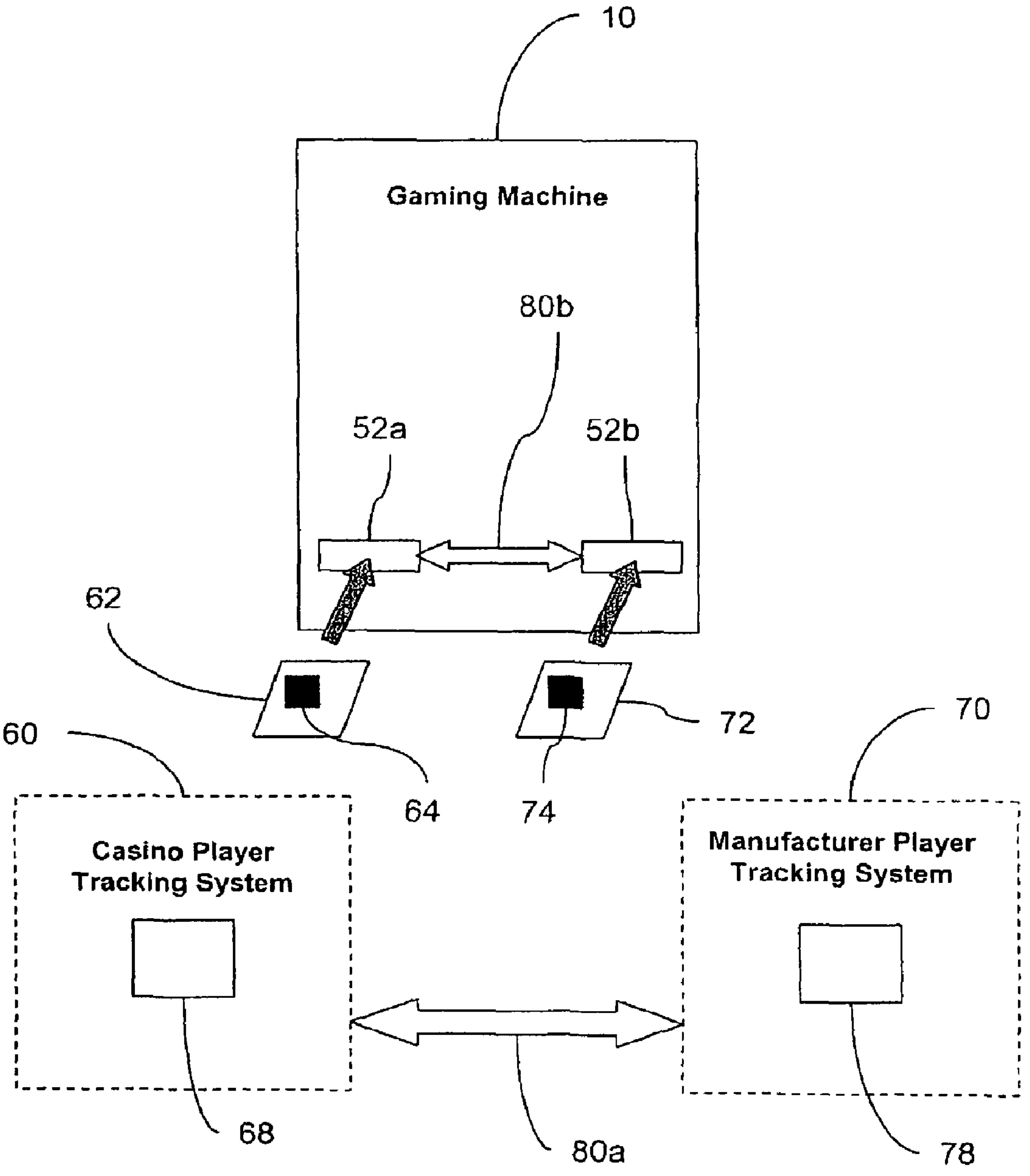
FIG. 3 is a block diagram of a manufacturer player tracking system in communication with a gaming system and a casino player tracking system.

Turning now to FIG. 3, in one embodiment, the gaming machine 10 includes a plurality of player information readers 52*a,b*. One player information reader is a casino player information reader 52*a*, and is in communication with a casino player tracking system 60. The casino player tracking system 60 stores player information such as name, address, and gameplay statistics (time on device, wager amounts, wins, losses, etc.). The casino player information reader 52*a* is configured so as to receive a casino player tracking unit 62, which in one embodiment is a casino player tracking card 62. The casino player tracking card 62 is a magnetic stripe card which stores a casino player identifier 64 associated with the player who possesses or owns the card 62. Preferably, the identifier 64 is a unique number associated with a particular player, but the identifier 64 may take on many forms including alphanumeric, biometric, graphical, etc. When placed in communication with the casino player tracking reader 52*a*, the card 62 is read, and the player identifier 64 stored on the card 62 is transferred to the casino player tracking system 60, whereby the player's information is accessed, retrieved, analyzed, modified, and stored. The casino player tracking system 60 may comprise one or more linked servers, processors and memories for storing, analyzing, retrieving, processing, and modifying the stored player information.

The gaming machine also includes a manufacturer player information reader 52*b*. The manufacturer player information reader 52*b* is in communication with a manufacturer player tracking system 70. The manufacturer player tracking system 70 stores player information such as name, address, and gameplay statistics (time on device, wager amounts, wins, losses, etc.). The manufacturer player information reader 52*b* is configured so as to receive a manufacturer player tracking unit 72, which in one embodiment is a manufacturer player tracking card 72. The manufacturer player tracking card 72 is a magnetic stripe card which stores a manufacturer player identifier 74 associated with the player who possesses or owns the card 72. Preferably, the identifier 74 is a unique number associated with a particular player, but the identifier 74 may take on many forms including alphanumeric, biometric, graphical, etc. When placed in communication with the manufacturer player tracking reader 52*b*, the card 72 is read, and the player identifier 74 number stored on the card 72 is transferred to the manufacturer player tracking system 70, whereby the player's information is accessed, retrieved, analyzed, modified, and stored. The manufacturer player tracking system 70 may comprise one or more linked servers, processors and memories for storing, analyzing, retrieving, processing, and modifying the stored player information.

The manufacturer player tracking system 70 may provide a number of uses to players of gaming machines 10. For example, the system 70 may be used to allow registered players to text chat amongst themselves when logged in at a gaming machine 10. Moreover, registered players may link their accounts so as to permit combined points earnings, etc. The system 70 could be further used for locating registered players at particular casinos, or even at particular gaming machines 10 within such casinos. Game preferences could be stored or associated with a player identifier 74 for use with the system 70. Moreover, the system 70 could be used for making reservations at particular themed gaming machines 10 or locating individuals, machines, or services within a casino. The system 70 could be further utilized in association with table games, such that a player could be logged in or present his manufacturer player tracking unit 72 or identifier 74 when playing a table game. The bonus or award points associated with play of the table games could be redeemed or utilized within the manufacturer player tracking system 70. Progressive, community, or distributed awards or prizes could be distributed via the system 70 to tracked players, or players actively playing gaming machines 10. Moreover, the system 70 could be used for any number of advertising, promotional features, sales, awards, or complimentary gifts.

Generally, the casino player tracking system 60 is owned and operated by a casino, host or operator where the gaming machine 10 is located and available for play. The manufacturer player tracking system 70 is owned and operated by the manufacturer of the gaming machine 10, and is configured to work with gaming machines 10 manufactured by that manufacturer, and optionally with other manufacturer's gaming machines as well. Both systems 60,70 are configured as networks which are in communication with individual gaming machines 10 located in casinos operated by the owner of the casino player tracking system 60, buy may additionally include networked components which are housed offsite external to the casino.

In accordance with the present invention, the manufacturer player identifier 74 is associated with one or more casino player identifiers 64 using one of a number of association methods. A player is issued a manufacturer player tracking unit 72 and given an assigned manufacturer player identifier 74 which is used to create a player account. The player tracking unit 72 may be issued to the player upon request, through a promotion, or as part of other awards packages. The player tracking unit 72 may be dispensed to the player at a kiosk or booth located within a casino, via mail, or other delivery means, and may be dispatched in response to a request by a player in person, by telephone, or via e-mail or the internet. Alternatively, or in addition to the player tracking unit 72, the player may be permitted to enroll for participation in the manufacturer player tracking system 70. Such enrollment may include generating or selecting a username and password for the player which may be performed at the gaming machine 10, or remote from the gaming machine 10, such as at a kiosk in the casino or over the internet. Enrollment may be performed upon request by the player, or automatically such that even players who refuse voluntary enrollment are assigned a username and password upon play of the gaming machine 10, and such players are tracked anonymously. Moreover, the data associated with an anonymously tracked player may be united with that player's manufacturer player identifier 74 at such later time that the anonymous player registers and enrolls in the system 70.

Once a player is in possession of a manufacturer player tracking unit 72, the unit 72 may be utilized to associate the manufacturer player identifier 74 with one or more casino player identifiers 64 and cards 62. In one embodiment, when a player of a particular manufacturer's gaming machine 10 (e.g. WMS Gaming) at a particular casino (e.g. Harrah's) inserts a casino player tracking card 62 into the casino player information reader 52*a*, at the same time that he or she has inserted a manufacturer player tracking card 72 into the manufacturer player information reader 52*b*, the association is triggered. For example, the gaming machine 10 may prompt the player to create the association by asking: "I see that you have inserted your Harrah's Entertainment card. Do you want to associate it with your WMS Gaming card?" If a player responds in the affirmative, then the casino player identifier 64 for that player is then associated with the manufacturer player identifier 74, and that association is stored on either the manufacturer player tracking system 70, the casino player tracking system 60, or both. If stored on the casino player tracking system 60, the association is stored in memory 68 which is accessible by at least the casino player tracking system 60, but alternatively could be accessible by both systems 60,70. Similarly, if stored on the manufacturer player tracking system 70, the association is stored in memory 78 and accessible by the manufacturer player tracking system 70, and potentially both systems 60,70. Moreover, the association may be stored on memory located on one or both of the cards 62,72 thereby allowing recall by the player information readers 52*a,b* without the need for accessing either system 60,70.

Thus, the association between the identifiers 64,74 is created at the gaming machine 10 following a prompt to the player and triggered by simultaneous insertion of the cards 62,72. Alternatively, the association may occur automatically without any input from the player. Moreover, the gaming machine 10 may include a menu option to create the association, such that the player need not wait to be prompted to create the association. The association may be accomplished by permitting the manufacturer player tracking system 70 to communicate with the casino player tracking system 60 to access the player identifier 64 contained thereon using a cross-system link 80*a,b*. The cross-system link 80*a* may connect the two systems directly 60,70 so that information stored thereon may be exchanged. Alternatively, the cross-system link 80*b* may be located in the gaming machine 10 such that the casino player tracking system 60 permits direct communication from the manufacturer player tracking card 72 and/or reader 52*b*. Other configurations of the cross-system link 80*a,b* are possible so as to facilitate the association of manufacturer player tracking identifiers 74 with casino player tracking identifiers 64.

The association between the identifiers 64,74 may occur in any number of additional or alternative ways. For example, a kiosk may be provided to a player whereby the player may insert both a manufacturer player tracking card 72 and a casino player tracking card 62 and provide inputs or instructions to create an association which is stored and transferred to memory in one or more of the systems 60,70. A player may also log in at a computer connected to one or more of the systems 60,70, and manually create the association, for example, by typing in the player identifiers 64,74 associated with each card 62,72. This manual entry could be accomplished online, over the internet, by email, through traditional mail, over the telephone, or at a local computer in the casino. Any number of alternative methods for creating the association may be employed such that the association is stored in memory 68,78 and available for recall.

Moreover, is should be understood that a single manufacturer player tracking identifier 74 may be associated with a plurality of casino player tracking identifiers 64 issued by a plurality of casinos. In this way, a single manufacturer player tracking card 72 may be used to recall a plurality of casino player tracking identifiers 64 for use at a plurality of casinos without the need for the player to carry a plurality of corresponding casino player tracking cards 62. In this way, the rmanufacturer player tracking card 72 acts as an "electronic wallet" or "universal card" by storing and recalling an association with potentially many casino player tracking cards 62 while requiring the carrying and insertion of only one card, the manufacturer player tracking card 72.

Once the association has been made, the identifiers 64,74 are linked for future gameplay. Thus if the same player ceases play of the first gaming machine 10 and later commences play at a second gaming machine 10 which is manufactured by the same manufacturer (WMS Gaming) located in a casino operated by the same operator (Harrah's), the association will be recalled. When the player inserts his or her manufacturer player tracking card 72 into the second gaming machine 10, the association is recalled such that the player is logged into both the manufacturer player tracking system 70 and the casino player tracking system 60, even though the player has not separately inserted a casino player tracking card 62. In this way, the association assists the player by alleviating the need to carry a myriad of casino player tracking cards 62 for various casinos. Instead, the player can carry and use the manufacturer player tracking card 72 and will be logged into and given access to all associated casino player tracking systems 60 and identifier 64.

Figure 4:
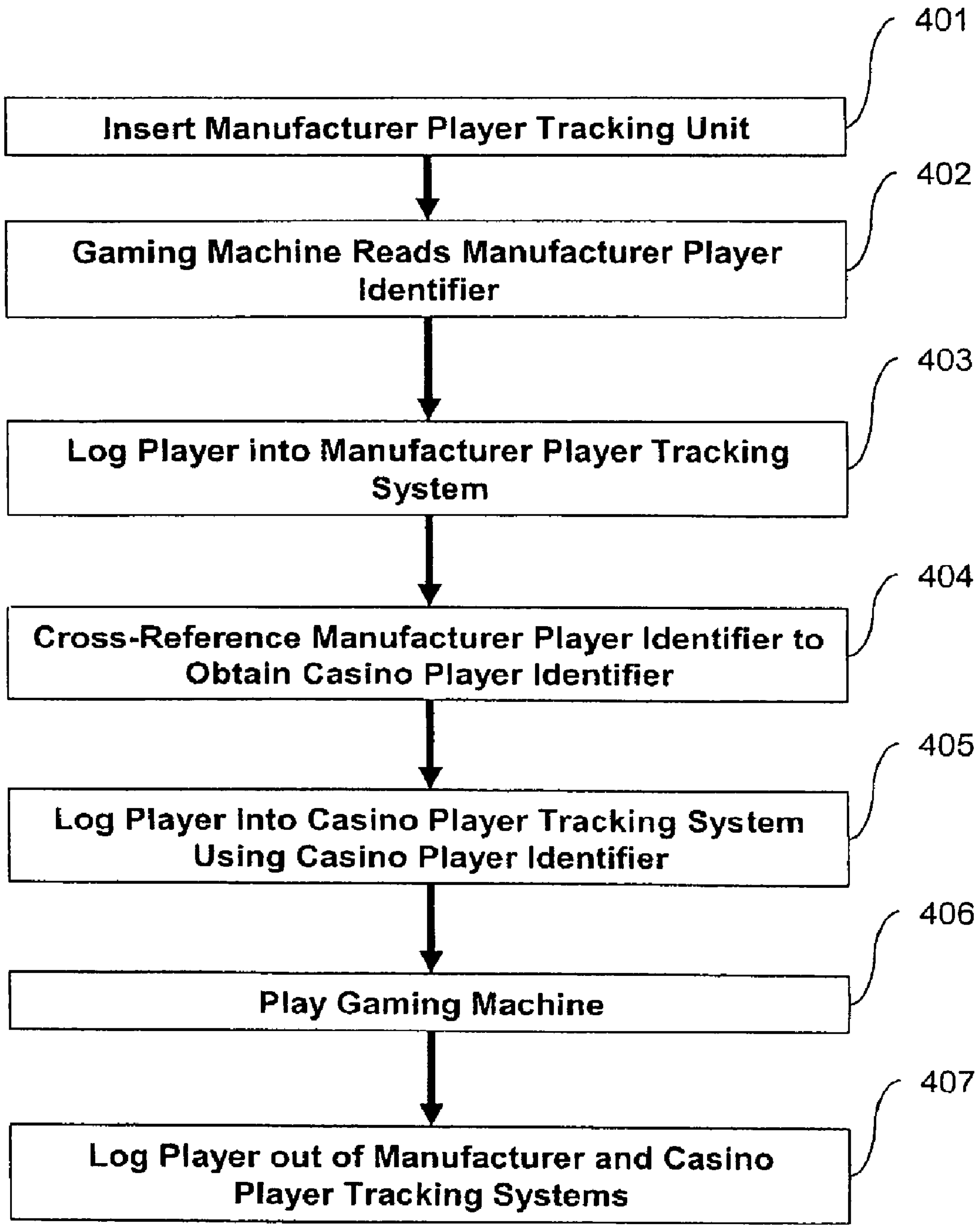
FIG. 4 is a flowchart illustrating the use of a manufacturer player tracking unit with a gaming system.

In FIG. 4, the association and recall of casino player tracking identifier 64 and manufacturer player tracking identifier 74 is depicted. In step 401, a player inserts a manufacturer player tracking card 72 into the gaming machine 10. The manufacturer player tracking card 72 is read by the machine 10 so as to obtain the manufacturer player tracking identifier 74 associated with the player, as seen in step 402. Once the manufacturer player tracking identifier 74 has been obtained, the player, in step 403, is logged into the manufacturer player tracking system 70 whereby predetermined gameplay data is tracked, as described herein. In step 404, once the manufacturer player tracking identifier 72 is retrieved, it is used to cross reference the casino player tracking identifier 62 for the same player. The cross referencing occurs using one of several methods described herein. For example, the casino player tracking identifier 62 for the player may be stored locally on the manufacturer player tracking card 72. Alternatively, the casino player tracking identifier 64 may be stored on a network including the casino player tracking system 60, and retrieved in response to a cross referencing request issued after detection of the corresponding manufacturer player tracking identifier 74.

In step 405, once the casino player tracking identifier 62 for the relevant player is retrieved from the cross-referencing process, the player is logged into the casino player tracking system 60 for purposes of being tracked by such system 60. The player then begins play of the gaming machine 10 as seen in step 406. In this way, the association from the cross-referencing serves to log the player into both systems 60,70 through the use of only one card (the manufacturer player tracking card 72). The player then continues play at the gaming machine 10 for so long as he or she desires. At the conclusion of a gaming sessions when a player terminates play of the gaming machine 10 and removes his manufacturer player tracking card 72, he is logged out of both tracking systems 60,70, as seen in step 407.

The association of one or more casino player tracking identifiers 64 with a manufacturer player tracking 74 provides tremendous advantages to a player. Firstly, as many players enjoy playing gaming machines 10 located at a plurality of casinos, and also enjoy participating in player tracking rewards opportunities, many players carry player tracking cards 62 from a number of casinos. This can be cumbersome and awkward, in addition to disorganized for the player. The association described herein permits the player to carry a single manufacturer player tracking card 72 to access play on that manufacturer's gaming machines 10 in any and all casinos, while simultaneously accessing the casinos' player tracking systems 60. This allows a player to conveniently carry one player tracking card 72 wherever he or she goes to play. The benefit extends to casinos by providing cost savings in misplaced, lost, or damaged cards, and allows casinos to operate an electronic software based system without the need for large quantities of physical cards 62.

Each of these embodiments and obvious variations thereof is contemplated as falling within the spirit and scope of the claimed invention, which is set forth in the following claims.

What is claimed is:

1. A gaming system comprising:

a wager input device;

a display for displaying a wagering game;

a manufacturer player identification reader for receiving a manufacturer player identifier;

a casino player identification reader for receiving a casino player identifier; and a controller operative to associate the casino player identifier with the manufacturer player identifier.

2. The gaming system of claim 1, wherein the casino player identification reader and the manufacturer identification reader are mounted in the housing of a freestanding gaming machine.

3. The gaming system of claim 1, wherein in response to the receipt of either the manufacturer player identifier or the casino player identifier, the controller is further operative to recall the other of the manufacturer player identifier or the casino player identifier.

4. The gaming system of claim 1, wherein the association is stored on a manufacturer player tracking system, a casino player tracking system, or both.

5. The gaming system of claim 1, further comprising a cross-system link connecting the manufacturer player identification reader and the casino player identification reader.

6. The gaming system of claim 1, wherein the manufacturer player identification reader receives a manufacturer player tracking unit and reads a manufacturer player tracking identifier stored thereon.

7. The gaming system of claim 3, wherein the controller is further operative to login the casino player identifier into at least one of a casino player tracking system and a manufacturer player tracking system.

8. A method of logging a player into a casino player tracking system for use during play of a wagering game on a gaming system, the method comprising:

reading a manufacturer player identifier provided by a player;

retrieving, via one or more processors a casino player identifier associated with the player; and logging, via the one or more processors the player into a casino player tracking system using the casino player identifier.

9. The method of claim 8, wherein the casino player identifier is retrieved from memory stored on a location selected from the group consisting of a casino player tracking system, a manufacturer player tracking system, and a manufacturer player tracking unit.

10. The method of claim 8, wherein the retrieving step comprises:

sending the manufacturer player identifier over a cross-system link to a casino player tracking system; and using an association stored in memory to recall the casino player identifier.

11. The method of claim 8, wherein the manufacturer player identifier is read from a manufacturer player tracking unit inserted into a player information reader of the gaming system.

12. A non-transitory computer readable storage medium encoded with instructions for directing a gaming system to perform the method of claim 8.

13. A method of associating one or more casino player identifiers with a manufacturer player identifier for use during play of a wagering game, the method comprising:

receiving a manufacturer player identifier associated with a player of the wagering game;

receiving a casino player identifier associated with the player;

associating, via one or more processors the casino player identifier and the manufacturer player identifier; and storing the association in memory accessible by a manufacturer player tracking reader for future recall.

14. The method of claim 13, wherein the manufacturer player identifier is stored on a manufacture player tracking unit readable by the manufacturer player tracking reader.

15. The method of claim 13, wherein the memory is selected from the group consisting of casino player tracking system memory, manufacturer player tracking group memory, and memory located on a manufacturer player tracking unit readable by the manufacturer player tracking reader.

16. The method of claim 13, wherein the associating step comprises transmitting the manufacture player identifier to a casino player tracking system via a cross-system link.

17. The method of claim 13, further comprising receiving a second casino player identifier associated with the player.

18. The method of claim 13, further comprising recalling the casino player identifier in response to a manufacturer player tracking unit containing the manufacturer player tracking identifier being placed in communication with the manufacturer player tracking reader.

19. A non-transitory computer readable storage medium encoded with instructions for directing a gaming system to perform the method of claim 13.

20. The method of claim 17, further comprising associating the second casino player identifier with the manufacturer player identifier.

* * * * *